(12) United States Patent
Jindal et al.

(10) Patent No.: US 7,971,262 B2
(45) Date of Patent: Jun. 28, 2011

(54) PROTECTING AGAINST SOFTWARE PIRACY

(75) Inventors: Dinesh K. Jindal, Naperville, IL (US); Venkateshwar Nandam, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1452 days.

(21) Appl. No.: 10/897,805

(22) Filed: Jul. 23, 2004

(65) Prior Publication Data
US 2006/0021067 A1 Jan. 26, 2006

(51) Int. Cl.
| | |
|---|---|
| G06F 7/04 | (2006.01) |
| G06F 9/44 | (2006.01) |
| G06F 21/00 | (2006.01) |
| H04L 29/06 | (2006.01) |
| G06F 21/22 | (2006.01) |
| G06F 21/24 | (2006.01) |
| G06F 1/00 | (2006.01) |
| H04L 9/00 | (2006.01) |

(52) U.S. Cl. ............... 726/29; 726/26; 726/27; 726/31; 717/168; 713/165; 705/59

(58) Field of Classification Search ............ 726/29, 726/26, 27
See application file for complete search history.

(56) References Cited

U.S. PATENT DOCUMENTS

| 6,056,786 | A * | 5/2000 | Rivera et al. | 709/229 |
|---|---|---|---|---|
| 6,226,747 | B1 * | 5/2001 | Larsson et al. | 726/31 |
| 7,503,072 | B2 * | 3/2009 | Hughes et al. | 726/26 |
| 2005/0044359 | A1 * | 2/2005 | Eriksson et al. | 713/165 |
| 2005/0268344 | A1 * | 12/2005 | Matsukawa et al. | 726/27 |

FOREIGN PATENT DOCUMENTS
WO WO 2007107905 A2 * 9/2007

OTHER PUBLICATIONS

Jun Yang, Youtao Zhang, Lan Gao; "Fast Secure Processor for Inhibiting Software Piracy and Tampering"; Dec. 2003; MICRO 36: Proceedings of the 36th annual IEEE/ACM International Symposium on Microarchitecture, Publisher: IEEE Computer Society, pp. 1-10.*

* cited by examiner

*Primary Examiner* — Matthew B Smithers
*Assistant Examiner* — Courtney D Fields
(74) *Attorney, Agent, or Firm* — Duft Bornsen & Fishman LLP

(57) ABSTRACT

Methods and software products are disclosed for protecting against software piracy. When a customer purchases software, the seller performs an activation process by identifying a unique computer identifier (ID) for the computer system of the customer, and activating the software based on the computer ID, such as by encoding the computer ID on the media storing the software. When the customer attempts to install the software on a computer system, the computer system executes an installation process. The computer system identifies its own computer ID and the computer ID used to activate the software. The computer system determines if its computer ID corresponds with the computer ID used to activate the software. If the computer IDs correspond, then the computer system is allowed to install the software. If not, the computer system is prevented from installing the software.

13 Claims, 4 Drawing Sheets

PROTECTING AGAINST SOFTWARE PIRACY

BACKGROUND OF THE INVENTION

1. Field of the Invention

The invention is related to the field of computer systems, and in particular, to methods and software products for protecting against software piracy or unlicensed use of software.

2. Statement of the Problem

Many people use computers daily at work or at home. For common personal computer software, a single license is granted to the customer purchasing the software. The customer can then install the software on their computer and run the software. The software typically displays the licensing agreement to the customer when the customer installs the software. The software may also have an optional/automatic registration screen that collects information on the customer and provides the information to the software vendor via the Internet. The connection to a network, however, is not necessary for installing every piece of software.

One problem for software vendors is unauthorized copying of the software or installation of the software on multiple computers. Software is typically sold on a computer-readable medium such as floppy disks or CDs. A customer may copy the floppy disk or CD and distribute the copies to others for installation on multiple computers. The customer may also use the floppy disk or CD to install the software on one computer, and then use the same floppy disk or CD to install the software on other computers. Unauthorized copying and installation such as this may breach licensing agreements between the customer and the software vendor, and may violate state and federal laws against such acts. The unauthorized copying and installation result in lost revenue for the software vendors. The lost revenues drive up the cost of the software which the customers ultimately end up paying. Current protection against unauthorized copying and installation of software do not effectively prevent the illegal acts.

SUMMARY OF THE SOLUTION

The invention solves the above and other related problems by preventing software from being installed on a computer system unless the software has been activated for that particular computer system. According to a method of the invention, when a customer purchases software, the software needs to be activated according to an activation process. For the activation process, the seller accesses an activation system that identifies a computer identifier (ID) for a computer system of the customer. Each computer system has a unique computer ID. The activation system then activates the software based on the computer ID for installation of the software on the computer system. The activation system may activate the software by encoding the computer ID on the media storing the software (such as a CD).

With the software activated, the customer may attempt to install the software on a computer system. When the customer attempts to install the software, the computer system executes an installation process. As part of the installation process, the computer system identifies its own computer ID. The computer system also identifies the computer ID used to activate the software. The installation process determines if the computer ID of the computer system where the software is being installed corresponds with the computer ID used to activate the software. If the computer IDs correspond, then the computer system is allowed to install the software. If the computer IDs do not correspond, then the computer system is prevented from installing the software.

Using the above method, software can only be installed on a computer system for which it has been activated. Software piracy can advantageously be prevented to protect the software vendors and honest customers.

The invention may include other exemplary embodiments described below.

DESCRIPTION OF THE DRAWINGS

The same reference number represents the same element on all drawings.

DETAILED DESCRIPTION OF THE INVENTION

FIGS. 1-6 and the following description depict specific exemplary embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

To describe the invention, assume that a customer purchases software at a store. The software is stored on a computer-readable medium, such as a CD, a DVD, a floppy disk, or some other storage media. Currently, the customer can take the software home and install the software on virtually any computer. According to the invention, the customer first gets the software activated before the customer can take the software home and install the software.

Activation Process

Figure 1:
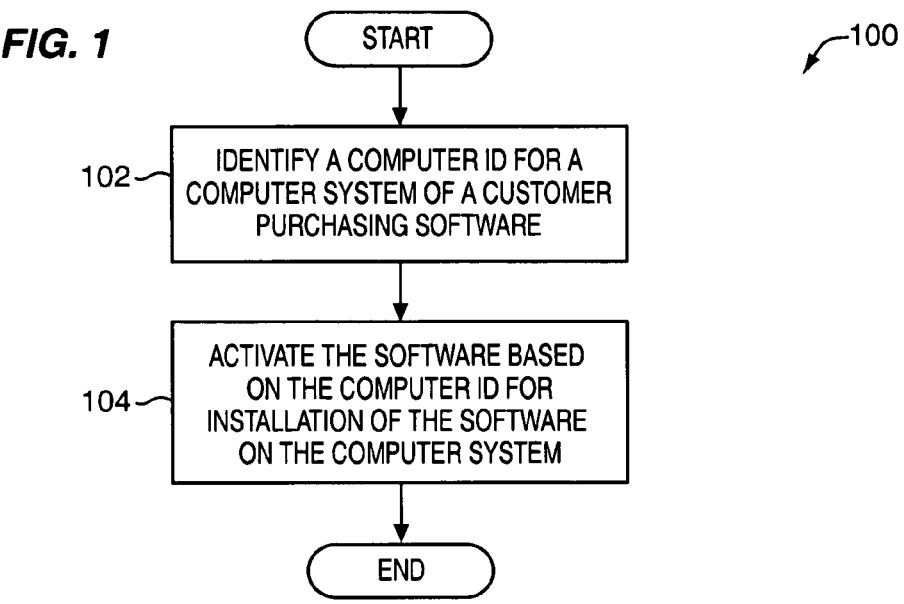
FIG. 1 is a flow chart illustrating an activation process in an exemplary embodiment of the invention.

FIG. 1 is a flow chart illustrating an activation process 100 in an exemplary embodiment of the invention. The seller of the software performs the activation process 100 using a computer or some other activation system. The seller is authorized to activate the software by the software vendor or another entity in a position to give such authorization, such as a governing or regulatory body. The seller may have to enter a PIN number, a user ID, a password, or some other authorization/authentication information before being allowed to activate the software. This is to avoid having unauthorized individuals activating software.

Figure 5:
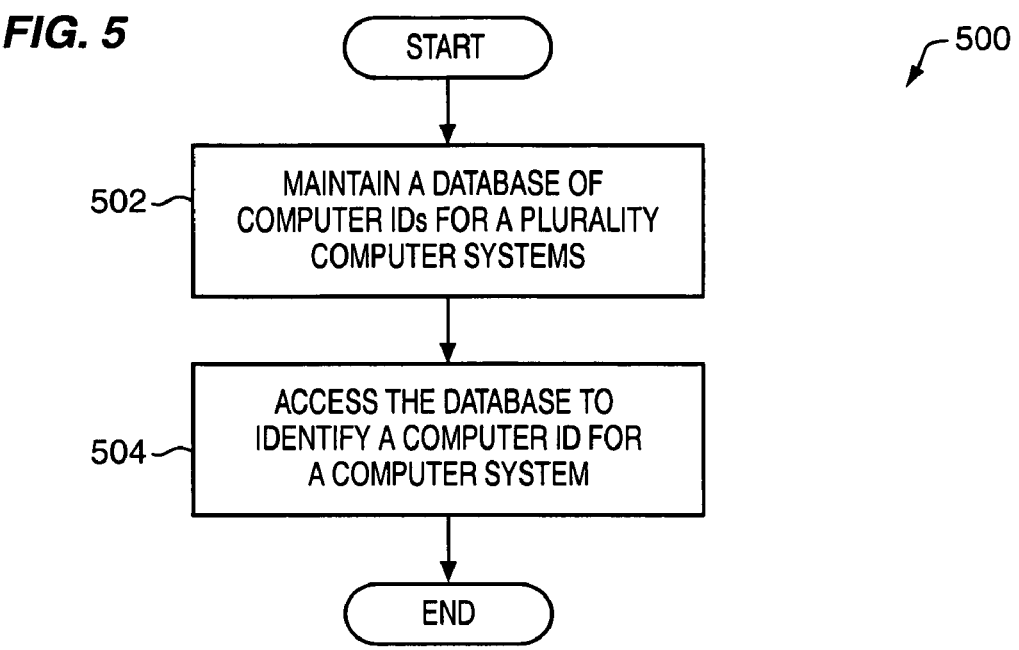
FIG. 5 is a flow chart illustrating a method of identifying computer IDs in an exemplary embodiment of the invention.

According to activation process 100, the activation system identifies a computer identifier (ID) for the computer system of the customer purchasing the software in step 102. The computer system, or its associated motherboard or operating system, includes a unique computer ID that distinguishes it from other computers. The computer ID is non-modifiable. The computer ID is like a social security number for computer systems. The customer purchasing the software may know the computer ID of their computer system. If the customer does not know their computer ID, the activation system automatically identifies the computer ID. FIG. 5 is a flow chart illustrating a method 500 of identifying computer IDs in an exemplary embodiment of the invention. In step 502, the activation system or another system or server maintains a database of computer IDs for a plurality of computer systems. There may be a large centralized database that maintains the computer IDs for all computer systems out on the market. Alternatively, the database may be more localized. For instance, the manufacturer of the computer system (e.g., Dell, IBM, Gateway, etc) may maintain the database. Also, the retailer selling the computer system may maintain the database. In any event, the activation system accesses the database to identify the computer ID for the computer system in step 504. The activation system may access the database over the Internet or another type of network. The computer IDs may be indexed in the database under the customer's name, the customer's phone number, the customer's social security number, etc. The database also tracks which software has been installed on which computer systems.

After identifying the computer ID, the activation system activates the software based on the computer ID for installation of the software on the computer system in step 104 (see FIG. 1). The activation system may activate the software by encoding the computer ID on the media storing the software. The activation system may encode the computer ID on the control or overhead tracks on the media storing the software, or some other designated area that is writable and reserved for a computer ID. For instance, assume that the media storing the software is a CD. The software vendor may designate that track 7 of the CD is reserved for activation purposes. This area of the CD is writable by an authorized activation system. When the activation system identifies the computer ID, the activation system encodes the computer ID in track 7 of the CD. The activation system may encode the computer ID (or an encrypted or encoded version of the computer ID) as any values, identifiers, control characters, or codes that identify the computer ID. The activation system may also encode the computer ID as part of a checksum or hash sum.

To avoid a seller from activating unauthorized copies of the software, the seller may have to be certified by the software vendor when activating software. For instance, the seller may be connected to the software vendor over a network. Each time software (or a new license for the software) is activated, the software vendor's database keeps track of the number of licenses issued. This is similar to activating a calling card or a cell phone.

Activation process 100 may include more steps than those illustrated in FIG. 1.

Figure 2:
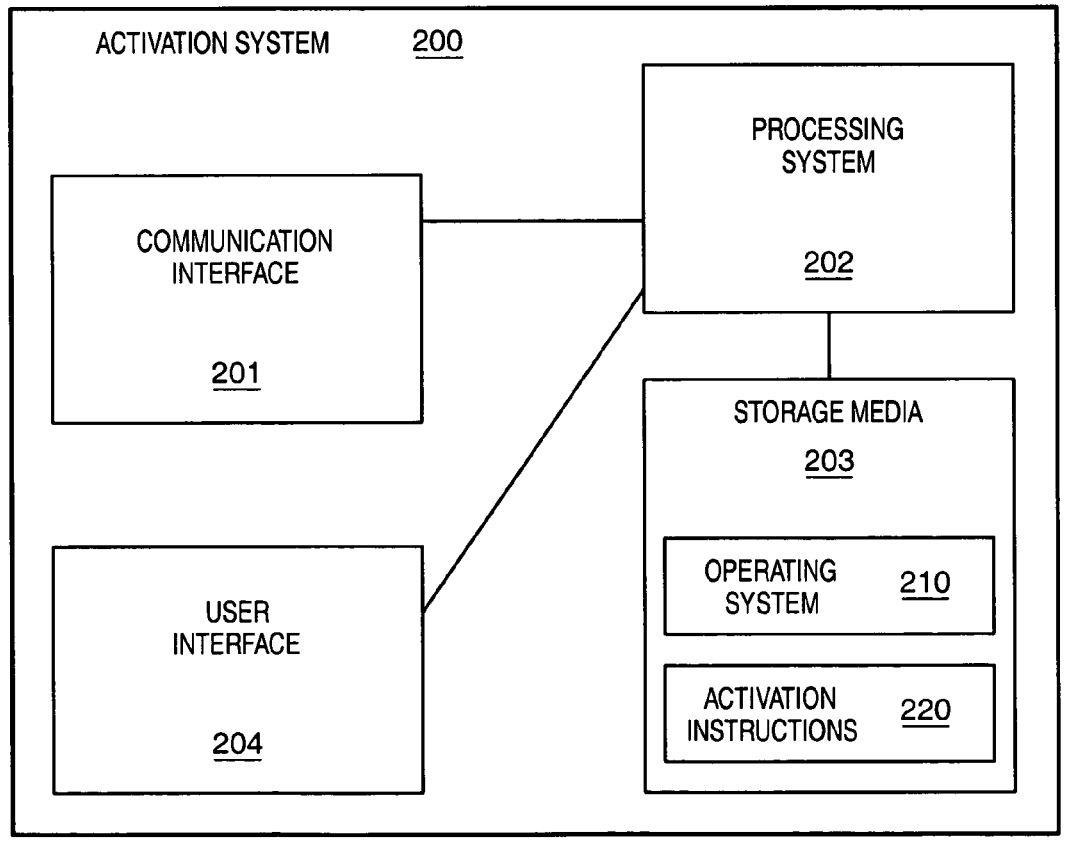
FIG. 2 illustrates an activation system in an exemplary embodiment of the invention.

FIG. 2 illustrates an activation system 200 in an exemplary embodiment of the invention. Activation system 200 includes a communication interface 201, a processing system 202, storage media 203, and a user interface 204. Storage media 203 stores operating system 210 and activation instructions 220. Processing system 202 operates according to operating system 210. Processing system 202 is linked to communication interface 201, storage media 203, and user interface 204. Activation system 200 could be comprised of a programmed general-purpose computer, such as a desktop computer or a laptop computer. Processing system 202 could comprise a computer microprocessor, logic circuit, or some other processing device. Storage media 203 could comprise a disk, tape, CD, integrated circuit, server, or some other memory device. Storage media 203 may be distributed among multiple memory devices. User interface 204 could comprise a display, keyboard, mouse, voice recognition interface, graphical display, touch-screen, or some other type of user device. Activation system 200 executes the activation instructions 220 to perform the activation process 100 described above.

Installation Process

Figure 3:
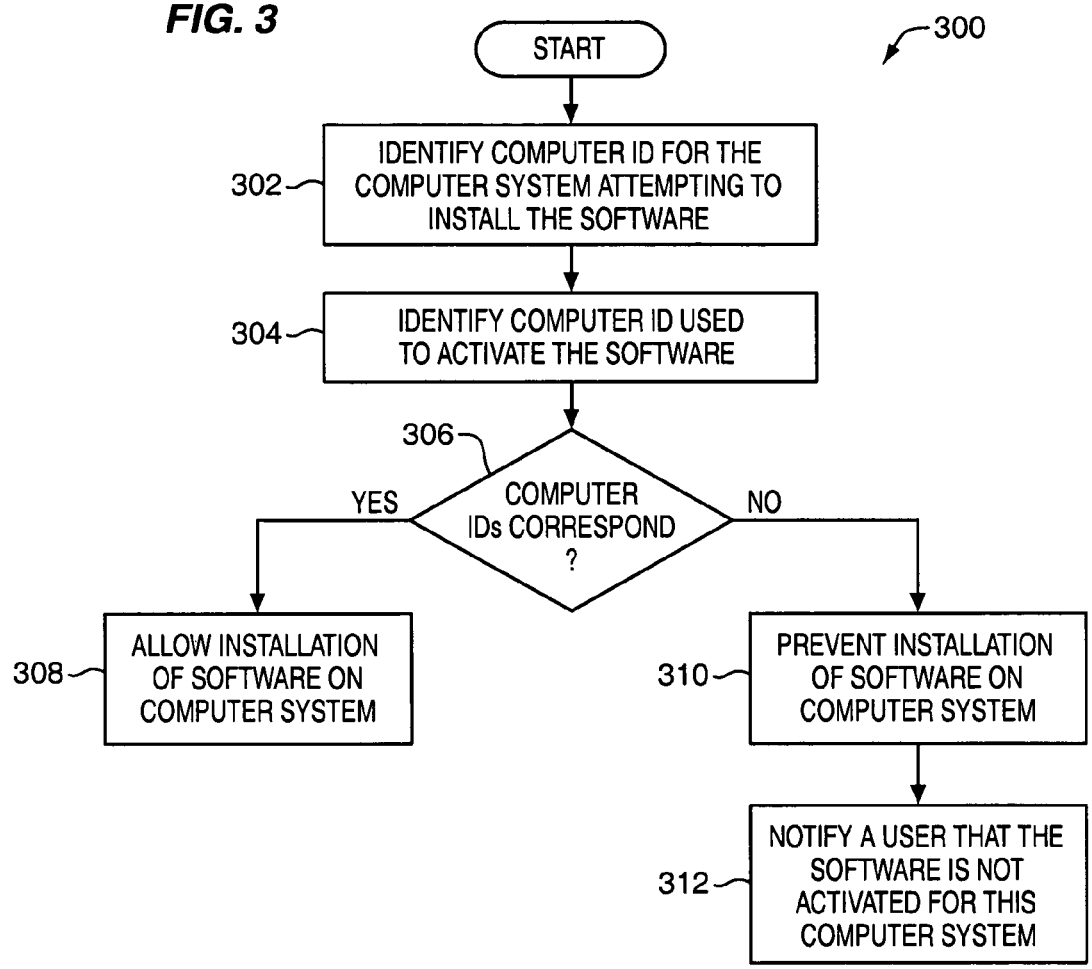
FIG. 3 is a flow chart illustrating an installation process in an exemplary embodiment of the invention.

After the software is activated, the customer may attempt to install the software on a computer. The software includes an installation process that when executed by a computer installs the software onto the computer. FIG. 3 is a flow chart illustrating an installation process 300 in an exemplary embodiment of the invention. According to installation process 300, upon initiating installation of the software, the computer system executing the installation process 300 identifies its own computer ID in step 302. The computer ID of the computer system is available to the operating system of the computer system at run-time. The computer system also identifies the computer ID (stored on the media as part of activation process) used to activate the software in step 304. The installation process 300 is compatible with the activation process 100 used to activate the software. Thus, installation process 300 knows where to find the computer ID used to activate the software on the storage media. For instance, if the activation system encodes the computer ID in track 7 of a CD, installation process 300 knows to read track 7 of the CD to obtain the computer ID used to activate the software.

In step 306, the computer system determines if the computer ID of the computer system attempting to install the software corresponds with the computer ID used to activate the software. To "correspond with" may mean that the computer ID of the computer system matches the computer ID used to activate the software. To "correspond with" may also mean that the computer ID of the computer system and the computer ID used to activate the software produce the same value when passed through an algorithm or decryption process. If the computer IDs correspond, then the computer system is allowed to install the software in step 308. If the computer IDs do not correspond, then the computer system is prevented from installing the software in step 310. The computer system notifies the user of the computer system that the software has not been activated for this computer system in step 312. The computer system may notify the user with a pop-up window or similar message.

Figure 4:
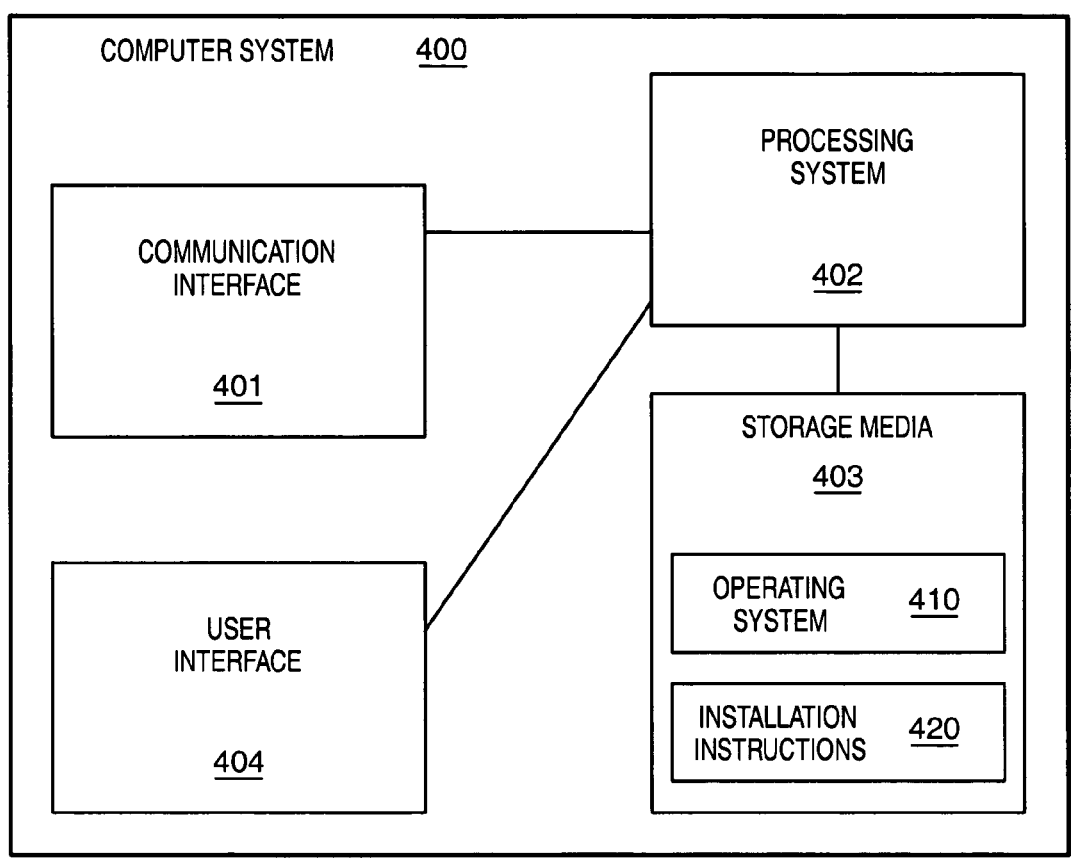
FIG. 4 illustrates a computer system for executing an installation process in an exemplary embodiment of the invention.

FIG. 4 illustrates a computer system 400 for executing the installation process 300 in an exemplary embodiment of the invention. Computer system 400 includes a communication interface 401, a processing system 402, a storage media 403, and a user interface 404. Storage media 403 stores operating system 410 and installation instructions 420. Processing system 402 operates according to operating system 410. Processing system 402 is linked to communication interface 401, storage system 403, and user interface 404. Computer system 400 could be comprised of a programmed general-purpose computer, such as a desktop computer or a laptop computer. Processing system 402 could comprise a computer microprocessor, logic circuit, or some other processing device. Storage media 403 could comprise a disk, tape, CD, integrated circuit, server, or some other memory device. Storage media 403 may be distributed among multiple memory devices. User interface 404 could comprise a display, keyboard, mouse, voice recognition interface, graphical display, touch-screen, or some other type of user device. Computer system 400 executes the installation instructions 420 to perform the installation process 300 described above.

Figure 6:
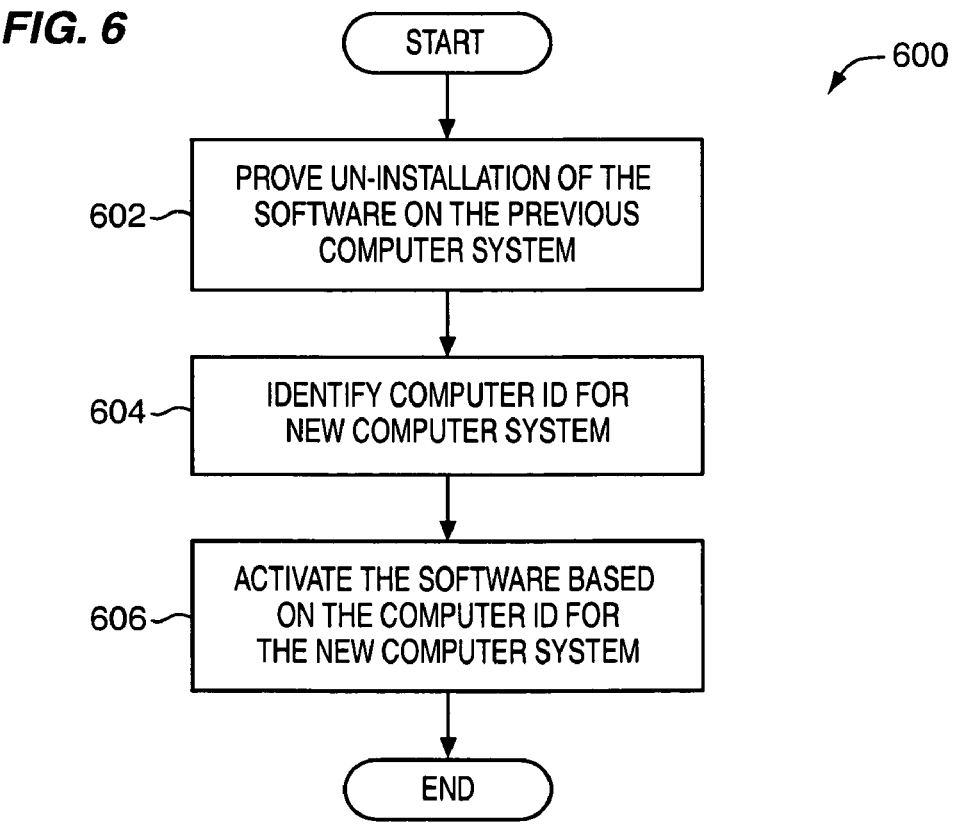
FIG. 6 is a flow chart illustrating a method of re-activating the software in an exemplary embodiment of the invention.

If the customer buys another computer or just wants to install the software on another computer, then the software needs to be re-activated for the new computer. To re-activate the software, the customer takes the software back to the seller (or another authorized entity). FIG. 6 is a flow chart illustrating a method 600 of re-activating the software in an exemplary embodiment of the invention. In step 602, the customer proves to the seller that the software has been uninstalled on the previous computer system. This can be done in any desired manner. For instance, the de-installation of software can be done by a program that can either write the computer ID of the computer system on a server over a network or on a writable media (like a floppy). The seller re-activating the software can then access the server or read the writable media to identify the computer ID of the computer system for which the software has been uninstalled.

In step 604, the activation system for the seller identifies a computer ID for the new computer system. In step 606, the activation system activates the software based on the computer ID for installation of the software on the new computer system. Once the software is activated for the new computer system, the customer may attempt to install the software using the installation process.

The processes described above work for a single-user license. Larger entities often purchase one copy of particular software for installation on multiple machines, and then purchase multiple licenses. To track the number of licenses used, a server on the entity's network knows how many licenses have been purchased. Then, when the software is installed on a machine, the server decrements that license from the number of licenses purchased. If the number of licenses purchased is exceeded, the server notifies the proper authorities.

In summary, the activation process and the installation process require that a customer have his/her software activated for a particular machine before the software can be installed on the machine. By doing this, a customer cannot install the software on two different machines because the software is only activated for the one machine. Also, if the customer copies the software, the copy of the software can only be installed on the machine for which the original copy was activated. Thus, the activation process and the installation process protect against unauthorized copying and installation of software.

These processes are based upon computers being identifiable by unique computer IDs that can be implemented on future microprocessors. If software is being installed on an existing computer system that doesn't have a computer ID, then the installation process may allow installation of the software even if the installation process determines that the computer system does not have a computer ID. That way, legacy computer systems may still be allowed to install software.

We claim:

1. A method of protecting against piracy of software, the method comprising the steps of:
   at the activation system,
   identifying a computer identifier (ID) for a computer system of a customer purchasing software;
   activating the software based on the computer ID for installation of the software on the computer system by encoding the media storing the software with the computer ID; and
   upon initiating installation of the software on the computer system from the media,
   identifying the computer ID for the computer system;
   identifying the computer ID encoded on the media;
   and determining if the computer ID for the computer system corresponds with the computer ID encoded on the media; and
   allowing installation of the software on the computer system responsive to a determination that the computer ID for the computer system corresponds with the computer ID encoded on the media.

2. The method of claim 1 further comprising the step of:
   preventing installation of the software on the computer system responsive to a determination that the computer ID for the computer system does not correspond with the computer ID encoded on the media.

3. The method of claim 1 wherein the computer ID for the computer system comprises a unique identifier that distinguishes the computer system from other computer systems.

4. The method of claim 3 wherein the computer ID is non-modifiable.

5. The method of claim 3 wherein the computer ID is available to the operating system of the computer system at run-time.

6. The method of claim 1 further comprising the step of:
   maintaining a database of a plurality of computer IDs for a plurality of computer systems.

7. The method of claim 6 wherein the step of identifying the computer ID for the computer system comprises:
   accessing the database to identify the computer ID for the computer system.

8. The method of claim 7 further comprising the step of:
   tracking the computer systems in the database for which the software has been activated.

9. The method of claim 1 further comprising the steps of:
   after installation of the software on the computer system, proving un-installation of the software on the computer system;
   identifying another computer ID for another computer system; and
   activating the software based on the other computer ID for installation of the software on the other computer system.

10. A non-transitory computer readable medium tangibly embodying programmed instructions which, when executed by a computer system, are operable to perform a method of activating and installing software, the method comprising:
    at the activation system,
    identifying a computer identifier (ID) for a computer system of a customer purchasing software;
    activating the software based on the computer ID for installation of the software on the computer system by encoding the media storing the software with the computer ID; and
    upon initiating installation of the software on the computer system from the media,
    identifying the computer ID for the computer system;
    identifying the computer ID encoded on the media; and
    determining if the computer ID for the computer system corresponds with the computer ID encoded on the media; and
    allowing installation of the software on the computer system responsive to a determination that the computer ID for the computer system corresponds with the computer ID encoded on the media.

11. The computer readable medium of claim 10 wherein the computer ID for the computer system comprises a unique identifier that distinguishes the computer system from other computer systems.

12. The computer readable medium of claim 10 wherein identifying a computer identifier (ID) for a computer system comprises accessing a database containing a plurality of computer IDs for a plurality of computer systems.

13. The computer readable medium of claim 10 wherein the method further comprises preventing installation of the software on the computer system responsive to a determination that the computer ID for the computer system does not correspond with the computer ID encoded on the media.

\* \* \* \* \*